(12) United States Patent
Takatama (10) Patent No.: US 7,586,412 B2
(45) Date of Patent: Sep. 8, 2009

(54) WIRELESS TAG, WIRELESS TAG READER/WRITER, WIRELESS TAG INFORMATION PROVISION METHOD, AND WIRELESS TAG SYSTEM

(75) Inventor: Hirokazu Takatama, Tokyo (JP)

(73) Assignee: NEC Corporation, Tokyo (JP)

( * ) Notice: Subject to any disclaimer, the term of this patent is extended or adjusted under 35 U.S.C. 154(b) by 268 days.

(21) Appl. No.: 11/408,933

(22) Filed: Apr. 24, 2006

(65) Prior Publication Data

US 2006/0238309 A1 Oct. 26, 2006

(30) Foreign Application Priority Data

Apr. 25, 2005 (JP) .............................. 2005-126277

(51) Int. Cl.
*G08B 13/14* (2006.01)
(52) U.S. Cl. ................. 340/572.1; 340/572.4; 340/10.1
(58) Field of Classification Search ............. 340/572.1, 340/572.4, 573.1, 573.3, 573.4, 573.6, 573.7, 340/539.11, 539.12, 539.26, 10.1, 10.33, 340/10.3; 702/187, 188
See application file for complete search history.

(56) References Cited

U.S. PATENT DOCUMENTS

| | | | | |
|---|---|---|---|---|
| 5,562,787 A * | 10/1996 | Koch et al. ..................... 156/64 |
| 5,999,091 A * | 12/1999 | Wortham ..................... 340/431 |
| 6,611,783 B2 * | 8/2003 | Kelly et al. .................. 702/150 |
| 6,980,084 B1 * | 12/2005 | Yones ...................... 340/10.34 |
| 7,174,277 B2 * | 2/2007 | Vock et al. ................... 702/188 |
| 7,233,781 B2 * | 6/2007 | Hunter et al. ............. 455/404.1 |
| 2002/0126005 A1 * | 9/2002 | Hardman et al. ............ 340/442 |
| 2005/0252979 A1 * | 11/2005 | Konuma et al. ............. 235/492 |
| 2007/0208542 A1 * | 9/2007 | Vock et al. ................... 702/187 |

FOREIGN PATENT DOCUMENTS

| | | |
|---|---|---|
| JP | 62-26999 A | 2/1987 |
| JP | 63-36116 A | 2/1988 |
| JP | 1-196518 A | 8/1989 |
| JP | 5-56936 A | 3/1993 |
| JP | 2001-187611 A | 7/2001 |
| JP | 2002-267313 A | 9/2002 |
| JP | 2002-358591 | 12/2002 |
| JP | 2003-310077 A | 11/2003 |
| JP | 2004-133506 | 4/2004 |
| JP | 2004-144683 | 5/2004 |
| JP | 2004-292147 | 10/2004 |
| JP | 2005-25240 | 1/2005 |
| JP | 2006-108755 A | 4/2006 |

* cited by examiner

*Primary Examiner*—Van T. Trieu
(74) *Attorney, Agent, or Firm*—Sughrue Mion, PLLC (57) ABSTRACT

A system comprising a wireless tag and a tag reader. The tag comprises: a sensor for generating a detected information; a storage for storing the detected information; a determination unit for storing a criteria information and outputting a result of determination on the detected information on the basis of the criteria information; and a communication control unit for transmitting the determination result in response to receiving a request. The reader transmits the request to the tag and receives the determination result from the tag.

12 Claims, 4 Drawing Sheets

WIRELESS TAG, WIRELESS TAG READER/WRITER, WIRELESS TAG INFORMATION PROVISION METHOD, AND WIRELESS TAG SYSTEM

This application claims priority to prior Japanese patent application JP 2005-126277, the disclosure of which is incorporated herein by reference.

BACKGROUND OF THE INVENTION

1. Field of the Invention

The present invention relates to a wireless tag capable of acquiring information detected by a built-in sensor, a wireless tag reader/writer, a wireless tag information provision method, and a wireless tag system.

2. Description of the Related Art

Along with development of information communication technology, the trend has set in to perform commodity management or to streamline the commodity information display or the commodity distribution by packaging a Radio Frequency (RF) tag having an integrated circuit with memory [generally, sometimes called as electronic tag, contactless data carrier, wireless IC tag, contactless IC, contactless IC label, contactless IC tag, RFID (Radio Frequency Identification) or NFC (Near Field Communication) tag] in articles and recording various types of information in the RF tag. The RF tag performs wireless communication with a RF tag reader device which reads information such as an identification code stored in the memory incorporated in the RF tag. Hereafter, the RF tag shall be referred to as "wireless tag".

Wireless tags having various types of built-in sensors have recently been drawing attention. The wireless tags with built-in sensors are employed in various systems. As an example of such systems, a perishable food management system suitable for characteristics and distribution mode of perishable foods has been proposed (see Japanese Laid-Open Patent Publication No. 2002-358591, paragraphs 0058-0060 (hereafter, Patent Publication 1), for example).

The system described in Patent Publication 1 is a system for managing preservation quality when storing and transporting perishable foods. According to this system, a tag includes a temperature sensor for detecting temperature, an impact sensor for detecting impact, a memory for storing data detected by the temperature and impact sensors, a transceiver for transmitting the data in the form of extremely low radio waves, and an identification number adding portion for adding an identification number unique to the tag to the data, and such tag is enclosed in a package containing perishable foods. A tag receiver for receiving data transmitted from the tag is installed in the vicinity of the place where the package is stored, and the tag receiver is connected to communication equipment which utilizes a communication circuit or wide area wireless networks. An information collection center is installed for collecting data on the tags from the communication equipment. The information collection center determines the preservation quality of the perishable food in each package based on a history of preservation environment indicated by the collected tag data, and informs the preservation quality to a terminal which makes an inquiry to the information collection center via a communication circuit Preservation environment determination means is further provided at least in any of the tag, a transport vehicle, and the information collection center for determining whether the preservation environment is good or not based on the data detected by the sensors in comparison with a predetermined threshold, and informing the determination result to the transport vehicle transporting the tag.

In addition to this conventional system, there have been proposed temperature sensors, temperature measurement devices, temperature measurement systems and programs utilizing a wireless tag having a rewritable mass data storage area (see Japanese Laid-Open Patent Publication No. 2004-144683, paragraphs 0017-0018 (hereafter, Patent Publication 2), for example).

A temperature sensor described in Patent Publication 2 is configured as a wireless tag having a resonant circuit the resonant frequency of which varies depending on temperature. The resonant circuit is composed of a coil and a capacitor. A material the dielectric constant of which varies according to variation in temperature is provided between electrodes of the capacitor. The wireless tag has a memory, communication means, and a microcomputer. The memory stores resonant frequency versus temperature characteristics of the resonant circuit as a table. The microcomputer transmits and receives radio waves via the communication means while changing the frequency to specify a resonant frequency of the resonant circuit, and specifies temperature corresponding to the resonant frequency by referring to the table. The microcomputer periodically specifies the resonant frequency and the temperature, and records the temperatures thus specified in the memory as a history. The microcomputer retrieves the temperature history stored in the memory in response to a command received via the communication means, and transmits the same via the communication means. The temperature measurement device described in Patent Publication 2 includes detection means for detecting a resonant frequency of the resonant circuit by transmitting and receiving radio waves to and from a wireless tag having a resonant circuit the resonant frequency of which varies depending on temperature, specifying means for specifying temperature of the wireless tag based on the detected resonant frequency, receiving means for receiving settings of monitoring temperature by the user, control means for controlling the detection means and the specifying means to periodically specify the temperature, determination means for determining whether or not the specified temperature has reached the monitoring temperature, and alarm means generating an alarm when it is determined that the specified temperature has reached the monitoring temperature.

There has also been proposed an electronic tag system which is able to shorten the processing time by periodically transmitting transmission information to record history information in a plurality of electronic tags, while simultaneously causing the system's internal information to be processed in parallel (see Japanese Laid-Open Patent Publication No. 2005-25240, paragraphs 0070-0075 (hereafter, Patent Publication 3), for example).

An electronic tag system described in Patent Publication 3 has a contactless electronic tag and a reader/writer for contactless electronic tags. The reader/writer includes common accessing means for accessing a plurality of contactless electronic tags in common, and means for transmitting information to the contactless electronic tags with the use of the common accessing means. The contactless electronic tag has means for receiving information provided by the common accessing means, computation means, storage means, and means for transmitting a response to the reader/writer or means for storing the computation result of the computation means in storage means. The computation means includes means for determining a response by using the information provided by the common accessing means and the information stored in the storage means.

SUMMARY OF THE INVENTION

According to the system described in Patent Publication 1, the information collection center is required to receive all the data detected by the sensors for determining whether the preservation environment is good or not. This induces a problem that it takes a long time to retrieve the data if the volume of the data detected by the sensors is large. When a large volume of data has to be retrieved from a wireless tag having built-in sensors, in particular, a battery incorporated in the wireless tag is consumed quickly, which shortens the product life of the wireless tag.

According to Patent Publication 2, the temperature measurement device has determination means for determining whether or not the specified temperature has reached the monitoring temperature, while the wireless tag has no determination means. Therefore, the temperature measurement device is required to retrieve all the temperature history data held by the wireless tag before implementing the determination. This induces a problem that it takes a long time to read the data if a volume of the temperature history data is large.

According to the Patent Publication 3, no sensor is incorporated in the system. Therefore, the system is unable to read or determine about data that varies all the time, for example, data of temperature around the wireless tag or temperature of the commodity to which the wireless tag is attached. Additionally, the information that is referred to for making determination is information that is transmitted by the common accessing means when requesting the data stored in the wireless tag. Therefore, if different types of information are to be referred to for different types of commodities, the types of information transmitted by the common accessing means are increased along with the increase of the types of commodities. This induces a problem that it takes a long time to process data when the data is requested.

It is therefore an object of the present invention to provide a novel wireless tag having built-in sensors, a wireless tag reader/writer, a wireless tag information provision method, and a wireless tag system which are capable of reducing the amount of data read by the wireless tag reader/writer to shorten the communication time and to enable quick data acquisition.

As an aspect of the present invention, a wireless tag wirelessly communicating with a wireless tag reader/writer, comprising: a sensor for detecting physical stimulus in and/or around the wireless tag to generate a detected information set; a first storage for storing the detected information set; a determination unit for storing a criteria information set and outputting a determination result information set indicating a result of determination on the detected information set on the basis of the criteria information set; and a communication control unit for transmitting the determination result information set output by the determination unit to the wireless tag reader/writer is provided. This aspect allows the wireless tag to transmit to the wireless tag reader/writer the determination result information instead of the detected information. Therefore, transmission quantity from the tag to the reader can be reduced.

The first storage may store the detected information set according to the determination result information set corresponding to the detected information. According to this configuration, the first storage is able to store only the data that has been determined to be either normal or abnormal, and thus the used storage area can be reduced.

The communication control unit may transmit to the wireless tag reader/writer at least one of a detected information set and a determination result information set according to the determination result information set corresponding to the transmitted information set(s). According to this configuration, the detected information and/or the determination result information may be transmitted only when the corresponding determination result has a predetermined value. Therefore, transmission quantity from the tag to the reader can be reduced.

The first storage may store a time information set indicating time at which a detected information is detected, in association with the detected information set. In this case, the communication control unit may transmit to the wireless tag reader/writer the time information set and at least one of the detected information set and the corresponding determination result information set. This configuration allows the reader device to obtain time change of the detected information and determination result information. It is particularly effective when the wireless tag transmits determination result information with a predetermined value such as abnormal or corresponding detected information. According to this configuration, the wireless tag reader/writer is able to acquire only the data that has been determined to be either normal or abnormal as the determination result without requesting all the detected information of the wireless tag.

In response to receiving a request for at least one of a detected information set and a determination result information set from the wireless tag reader/writer, the communication control unit may transmit the requested information set(s) to the wireless tag reader/writer. According to this configuration, the wireless tag reader/writer is only required to communicate with the wireless tag on the as-needed basis if the reading of the determination result information is not always required. This enables the flexible arrangement of the wireless tag reader/writer.

The wireless tag may further comprise a second storage for storing the determination result information set. In this case, in response to receiving a request for the determination result information set from the wireless tag reader/writer, the communication control unit may transmit the determination result information set stored in the second storage. According to this configuration, it is made possible to shorten the time period from when the wireless tag reader/writer transmits determination result request information until it receives a determination result, and thus the determination result can be ascertained even more quickly.

The communication control unit may receive another criteria information set from the wireless tag reader/writer. In this case, the determination unit may update the criteria information set to the other criteria information set. According to this configuration, the reader device can update criteria information stored in the wireless tag.

As another aspect of the present invention, a wireless tag reader/writer wirelessly communicating with a wireless tag having a detection unit for detecting information on the wireless tag itself and the area surrounding the wireless tag, wherein the wireless tag reader/writer transmits an information set to request the wireless tag for a determination result information set indicating a result of determination on the detected information set on the basis of a criteria information set is provided.

The wireless tag reader/writer may transmit an information set to request the wireless tag for the detected information.

The wireless tag reader/writer may further transmit a criteria information set to the wireless tag.

As another aspect of the present invention, a method of transmitting a information set from a wireless tag to a wireless tag reader/writer, comprising the steps of: detecting physical stimulus in and/or around the wireless tag to generate a detected information set by a sensor of the wireless tag; storing the detected information set to a storage of the wireless tag; evaluating, at the wireless tag, the detected information set on the basis of a criteria information set, which is previously transmitted to the wireless tag, to generate a determination result information set; and transmitting the determination result information set from the wireless tag to the wireless tag reader/writer is provided.

As another aspect of the present invention, a wireless tag system comprising a wireless tag and a wireless tag reader/writer that wirelessly communicating with the wireless tag is provided. In this system, the wireless tag comprises: a sensor for detecting physical stimulus in and/or around the wireless tag to generate a detected information set; a first storage for storing the detected information set; a determination unit for storing a criteria information set and outputting a determination result information set indicating a result of determination on the detected information set on the basis of the criteria information set; and a communication control unit for transmitting the determination result information set output by the determination unit in response to receiving a request for the determination result information set. The wireless tag reader/writer transmits the request to the wireless tag and receives the determination result information from the wireless tag.

According to the present invention, a wireless tag having built-in sensors is provided with a determination unit so that the wireless tag is able determine whether sensor data is normal or not. The wireless tag is also able to store the sensor data. Since the wireless tag has the determination unit, there is no need of transmitting all the data from the wireless tag. This makes it possible to shorten the communication time and to ascertain the determination result quickly. Also, the wireless tag reader/writer is able to acquire only the data that has been determined to be normal or abnormal as a determination result without requesting all the detected information from the wireless tag. The detected information storage unit is able to store only the data that has been determined to be normal or abnormal, and thus the used storage area can be reduced.

DESCRIPTION OF THE PREFERRED EMBODIMENTS

First Embodiment

Figure 1:
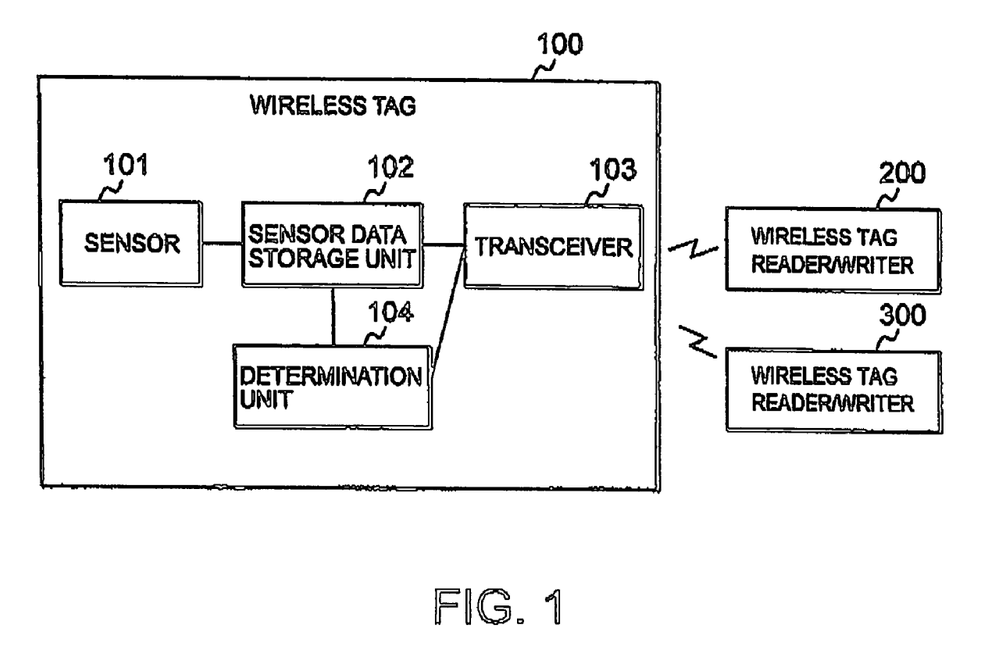
FIG. 1 is a block diagram illustrating a first embodiment of a wireless tag system according to the present invention.

A first embodiment of the present invention will now be described with reference to the accompanying drawings. FIG. 1 is a block diagram illustrating a first embodiment of a wireless tag system according to the present invention. The wireless tag system shown in FIG. 1 includes a wireless tag 100, a wireless tag reader/writer 200, and a wireless tag reader/writer 300.

The wireless tag 100 includes a sensor 101, a sensor data storage unit 102, a transceiver 103, and a determination unit 104. The wireless tag 100 further includes a CPU (not shown) operating according to a program and a storage device (not shown) storing the program. Functions of the wireless tag 100 are carried out by the CPU executing the program designed to perform the functions.

The sensor 101 is for detecting a physical amount such as temperature or pressure, and detects such data relating to the area surrounding the wireless tag and a commodity to which the wireless tag is attached. The sensor data storage unit 102 is for example a storage medium such as a nonvolatile memory, and stores the data detected by the sensor 101.

The transceiver 103 has a built-in antenna function, and has a function of performing processing to transmit/receive a wireless signal to/from the wireless tag reader/writers 200 and 300. The transceiver 103 performs processing to output criteria data received from the wireless tag reader/writer 200 or a determination result request received from the wireless tag reader/writer 300 to the determination unit 104, and processing to transmit information such as data stored in the sensor data storage unit 102 or a determination result output by the determination unit 104 to the wireless tag reader/writers 200 and 300.

The determination unit 104 has a function of performing processing to determine whether or not the data stored in the sensor data storage unit 102 is normal based on the criteria data output by the wireless tag reader/writer 200, and to output the determination result. The determination result may be information indicating whether or not the stored data contains data determined abnormal (abnormal data). For example, when the sensor data consists of only one item, the information may indicate whether the data is normal or abnormal only. When the sensor data consists of a plurality of items, the information may indicate that the data is normal if all the data items are normal, and indicate that the data is abnormal if any one of the data items is abnormal. The determination unit 104 is embodied by the CPU in the wireless tag 100 executing the program designed to perform the function thereof.

The wireless tag reader/writer 200 wirelessly communicates with the wireless tag 100, and has a function of performing processing to transmit criteria data, that is used for determining whether the data stored in the sensor data storage unit 102 is abnormal or not, to the transceiver 103.

The wireless tag reader/writer 300 also wirelessly communicates with the wireless tag 100, and has a function of performing processing to transmit to the transceiver 103 a determination result request requesting a determination result output by the determination unit 104, and to receive the determination result from the transceiver 103. The wireless tag reader/writer 300 further has a function of performing processing to transmit to the transceiver 103 a sensor data request requesting the sensor data stored in the sensor data storage unit 102 and to receive the sensor data from the transceiver 103.

In the first embodiment, a detection unit is embodied by the sensor 101. A detected information storage unit is embodied by the sensor data storage unit 102. A determination unit is embodied by the determination unit 104. A communication control unit is embodied by the transceiver 103. A determination result requesting unit and a detected information requesting unit are embodied by the CPU in the wireless tag reader/writer 300 executing a program designed to perform the functions thereof.

Figure 2:
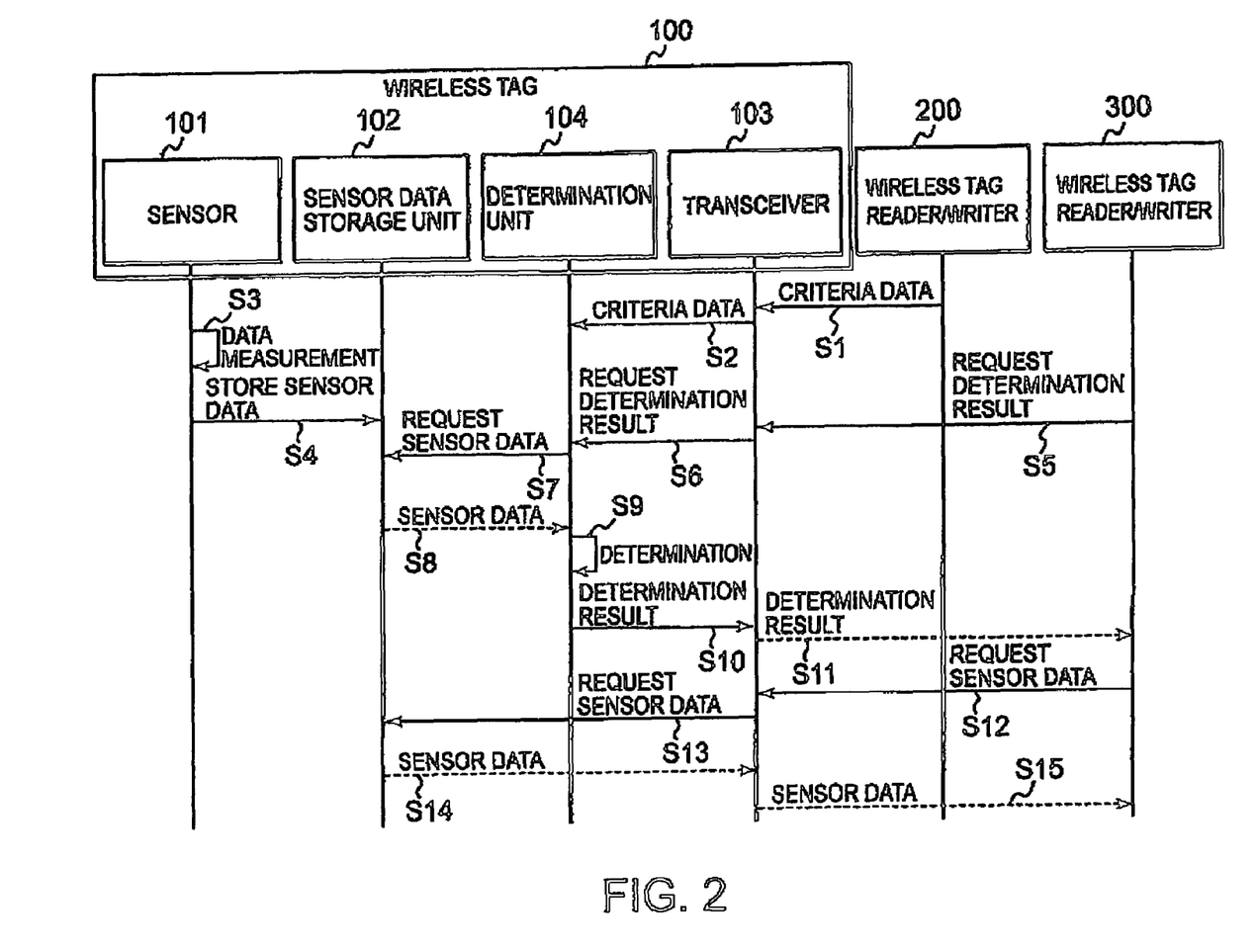
FIG. 2 is a sequence diagram illustrating operation of the wireless tag system of the first embodiment.

Operation of the first embodiment will now be described with reference to FIG. 2. FIG. 2 is a sequence diagram illustrating the operation of the wireless tag system according to the first embodiment. In the sequence diagram of FIG. 2, the solid-line arrows denote requests, and the broken-line arrows denote responses. The following description will be made in terms of an example in which the sensor 101 is a temperature sensor, the criteria data transmitted by the wireless tag reader/writer 200 is set such that the data is determined normal if the temperature is zero degrees or higher and lower than 30 degrees, and the determination result is information indicating whether the data contains abnormal data or not.

The wireless tag reader/writer 200 transmits the criteria data to the transceiver 103 of the wireless tag 100 (step S1). The transceiver 103 outputs the received criteria data to the determination unit 104 (step S2). The determination unit 104 stores the received criteria data or updates a current criteria data to the received one.

The sensor 101 measures temperature around the wireless tag and of a commodity to which the wireless tag is attached (step S3), and stores the measurement data in the sensor data storage unit 102 as sensor data (step S4). The processing steps of step S3 and step S4 are repeated whereby the sensor data history is stored in the sensor data storage unit 102.

The wireless tag reader/writer 300 transmits a determination result request to the transceiver 103 of the wireless tag 100 (step S5). The transceiver 103 outputs the received determination result request to the determination unit 104 (step S6).

The determination unit 104 requests the sensor data stored in the sensor data storage unit 102 (step S7), and acquire the same (step S8). The determination unit 104 determines, based on the criteria data, that the sensor data is normal if the temperature is zero degrees or higher and lower than 30 degrees, whereas determines that the sensor data is abnormal if the temperature is lower than zero degrees or 30 degrees or higher (step S9).

The determination unit 104 outputs the determination result to the transceiver 103 (step S10). The transceiver 103 transmits the determination result to the wireless tag reader/writer 300 (step S11).

In addition to the determination result, the wireless tag reader/writer 300 is also able to request the sensor data from the wireless tag 100 if required. In this case, the wireless tag reader/writer 300 transmits a sensor data request to the transceiver 103 of the wireless tag 100 (step S12). The transceiver 103 requests the sensor data stored in the sensor data storage unit 102 (step S13), and acquires the same (step S14). The transceiver 103 then transmits the sensor data to the wireless tag reader/writer 300 (step S15).

According to the first embodiment as described above, the wireless tag with a built-in sensor has a determination unit so that the wireless tag is able to determine whether or not the sensor data is normal. This means that the wireless tag reader/writer is not required to make the determination and hence it is not necessary to transmit the entire sensor data stored in the wireless tag to the wireless tag reader/writer. Consequently, it is made possible to shorten the period of time required for data communication between the wireless tag and the wireless tag reader/writer and to quickly ascertain the determination result indicating whether the sensor data is normal or not. When the first embodiment is applied to a commodity distribution system, for example, the processing speed can be improved when a commodity bearing a wireless tag passes through a check point provided with the wireless tag reader/writer. When the wireless tag has a battery incorporated therein so as to use the battery power for data transmission, the power consumed for reading the data can be reduced and hence the product life of the wireless tag can be increased.

Since the wireless tag is able to store the sensor data, the wireless tag reader/writer has only to communicate with the wireless tag on the as-needed basis if it is not required to read the data constantly. This makes it possible to arrange the wireless tag reader/writer more flexibly.

Further, the wireless tag is able to store criteria data according to the type of the commodity or the type of the sensor. Therefore, even if the types of the commodities to which the wireless tag is attached or the types of the sensors mounted in the wireless tag are increased, the wireless tag reader/writer is not required to select which criteria are to be used for which wireless tag. Accordingly, such increase will not affect the processing time to request the data or to read the data.

Second Embodiment

Figure 3:
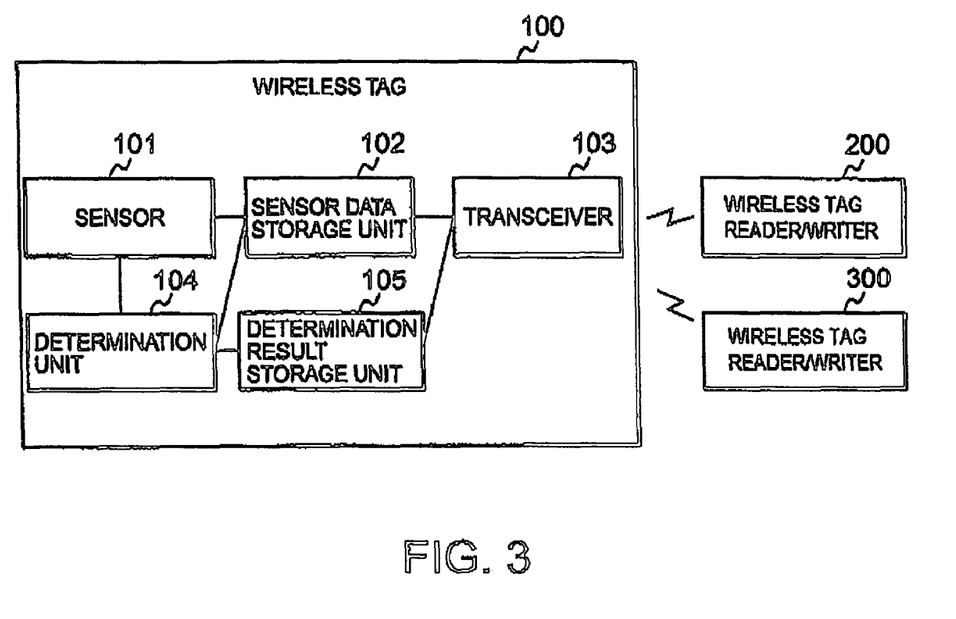
FIG. 3 is a block diagram illustrating a second embodiment of a wireless tag system according to the present invention.

A second embodiment of the present invention will now be described with reference to the drawings. FIG. 3 is a block diagram illustrating a wireless tag system according to the second embodiment of the present invention. A wireless tag system shown in FIG. 3 includes a wireless tag 100, a wireless tag reader/writer 200, and a wireless tag reader/writer 300.

The wireless tag 100 includes a sensor 101, a sensor data storage unit 102, a transceiver 103, a determination unit 104, and a determination result storage unit 105. The wireless tag 100 further includes a CPU operating according to a program and a storage device storing the program. Functions of the wireless tag 100 are implemented by the CPU executing the program designed to perform the functions.

The determination result storage unit 105 is a storage area for storing a determination result output by the determination unit 104. In other aspects, the configuration of the wireless tag system is similar to that of the first embodiment (see FIG. 1), and the description thereof is omitted.

In the second embodiment, a determination result storage unit is embodied by the determination result storage unit 105.

Figure 4:
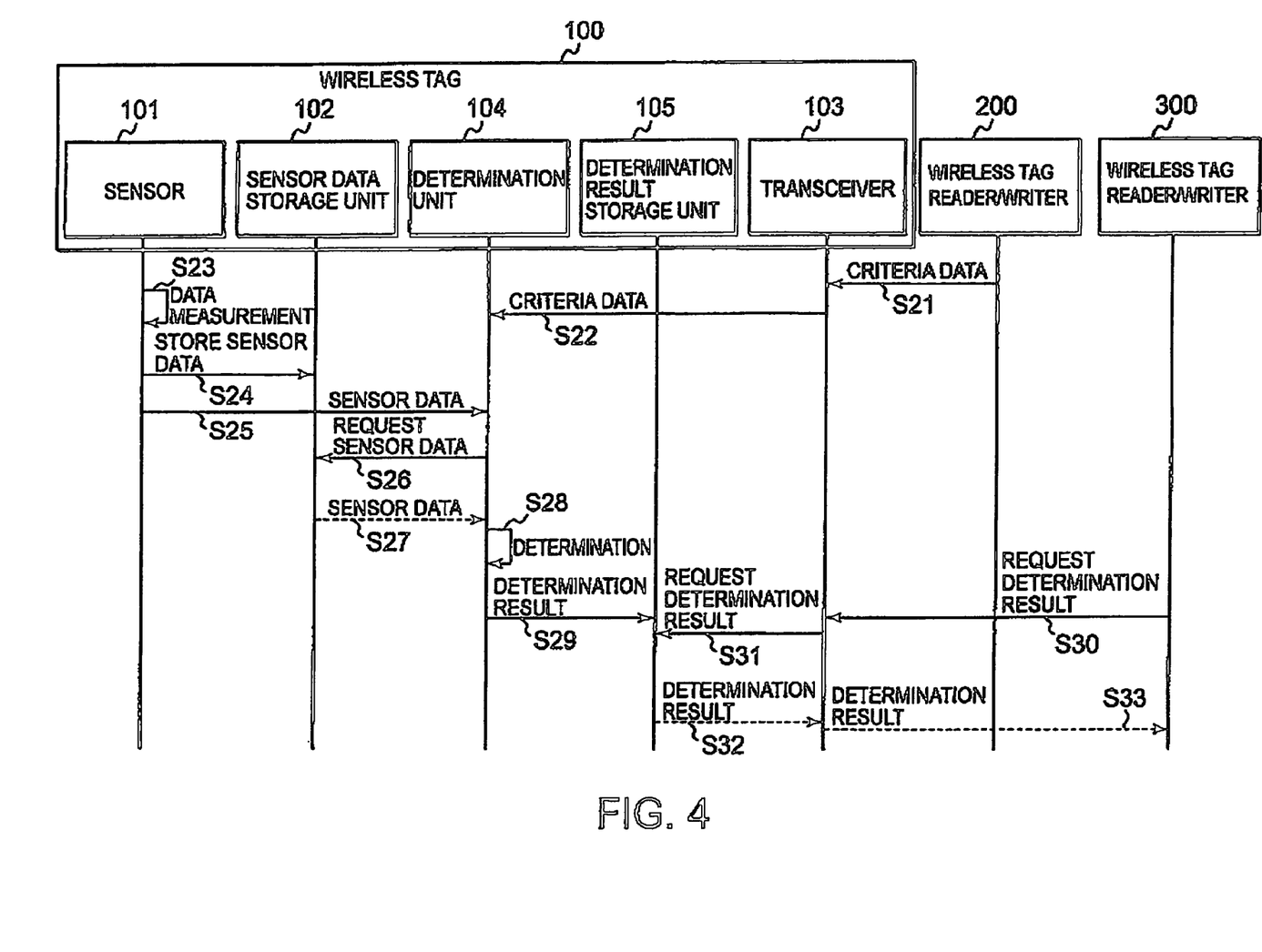
FIG. 4 is a sequence diagram illustrating operation of the wireless tag system of the second embodiment.

Operation of the second embodiment will now be described with reference to FIG. 4. FIG. 4 is a sequence diagram illustrating the operation of the wireless tag system according to the second embodiment. In the sequence diagram of FIG. 4, the solid-line arrows denote requests, while the broken-line arrows denote responses. The following description will be made in terms of an example in which the sensor 101 is a temperature sensor, the criteria data transmitted by the wireless tag reader/writer 200 is set such that the data is determined normal if the temperature is zero degrees or higher and lower than 30 degrees, and the determination result is information indicating whether the data contains abnormal data or not.

The wireless tag reader/writer 200 transmits the criteria data to the transceiver 103 of the wireless tag 100 (step S21). The transceiver 103 outputs the received criteria data to the determination unit 104 (step S22).

The sensor 101 measures temperature around the wireless tag and of a commodity to which the wireless tag is attached (step S23), and stores the measurement data in the sensor data storage unit 102 as sensor data (step S24). The processing steps of step 823 and step S24 are repeated, whereby the sensor data history is stored in the sensor data storage unit 102. The sensor 101 outputs information indicating that the sensor data has been stored to the determination unit 104 (step S25).

The determination unit 104 requests the sensor data stored in the sensor data storage unit 102 when required (step S26), and acquires the same (step S27). The determination unit 104 determines, based on the criteria data, that the sensor data is normal if the temperature is zero degrees or higher and lower than 30 degrees, whereas determines that the sensor data is abnormal if the temperature is lower than zero degrees or 30 degrees or higher (step S28). The determination unit 104 stores the determination result in the determination result storage unit 105 (step S29).

The wireless tag reader/writer 300 transmits a determination result request to the transceiver 103 of the wireless tag 100 (step S30). In response to the received determination result request, the transceiver 103 requests the determination result to the determination result storage unit 105 (step S31), and acquires the determination result (step S32). The transceiver 103 transmits the determination result to the wireless tag reader/writer 300 (step S33).

Alternatively, the system may be designed such that, when the wireless tag reader/writer 300 transmits a determination result request to the transceiver 103 of the wireless tag 100, the transceiver 103 outputs the determination result request to the determination unit 10, and the determination unit 104 requests and acquires the sensor data stored in the sensor data storage unit 102, determines whether the sensor data is normal or not based on the criteria data, and stores the determination result in the determination result storage unit 105. The transceiver 103 then requests the determination result storage unit 105 for the determination result, acquires the same, and transmits the determination result thus acquired to the wireless tag reader/writer 300.

According to the second embodiment as described above, the determination unit 104 outputs a determination result on the as-needed basis, and the determination result storage unit 105 stores the determination result. Accordingly, in addition to the advantageous effects provided by the first embodiment, the second embodiment further provides an advantageous effect that the period of time from when the wireless tag reader/writer 300 transmits a determination result request until it receives the determination result can be shortened and hence the determination result can be ascertained even more quickly.

Third Embodiment

The description of the embodiments above has been made in terms of an example in which the determination result output by the determination unit 104 is information indicating whether or not abnormal data is contained in the sensor data. However, the determination result may be information containing abnormal data or a time at which the abnormal data is detected. Further, the determination result may be information containing abnormal data and a time at which the abnormal data is detected.

A description will now be made of a third embodiment of the present invention relating to a case in which information of the determination result contains abnormal data and a time at which the abnormal data is detected. System configuration of the third embodiment is similar to that of the first embodiment (see FIG. 1) and hence the description thereof will be omitted.

The sensor 101 stores detected data and detected time thereof in association with each other in the sensor data storage unit 102 as sensor data. The determination unit 104 acquires the sensor data stored in the sensor data storage unit 102.

The determination unit 104 makes determination on the sensor data based on the criteria data, and outputs, as a determination result, information indicating whether or not the sensor data contains abnormal data and information containing the abnormal data and a time at which the abnormal data is detected, to the wireless tag reader/writer 300 via the transceiver 103.

In addition to the advantageous effects provided by the first embodiment, the third embodiment as described above provides a further advantageous effect in that the wireless tag reader/writer 300 is able to acquire only the abnormal data as the determination result without requesting all the sensor data from the wireless tag 100s. Accordingly, in comparison with the case of requesting all the sensor data, the period of time required for data communication between the wireless tag and the wireless tag reader/writer can be shortened. This means that the result determined to be abnormal can be ascertained more quickly.

Third embodiment may be combined with the second embodiment.

Fourth Embodiment

The description of the embodiments above has been made in terms of an example in which the sensor data storage unit 102 stores all the data detected by the sensor 101. However, the sensor data storage unit 102 may store only abnormal data.

A description will now be made of a fourth embodiment of the present invention in which the sensor data storage unit 102 stores only abnormal data. The system configuration of the fourth embodiment is similar to that of the second embodiment (see FIG. 3) and hence the description thereof will be omitted.

The sensor 101 outputs data obtained by measurement to the determination unit 104 as sensor data. The determination unit 104 makes determination on the sensor data based on the criteria data, and stores only abnormal data in the sensor data storage unit 102. Repeating these processing steps, the abnormal data history is stored in the sensor data storage unit 102. The determination unit 104 stores the determination result in the determination result storage unit 105.

According to the fourth embodiment as described above, the determination unit 104 outputs a determination result when required and the determination result storage unit 105 stores the determination result, while the sensor data storage unit 102 stores only abnormal data. This enables the determination result to be ascertained more quickly. Additionally, the storage area used by the sensor data storage unit 102 can be reduced. Further, the sensor data storage unit 102 is able to store a larger volume of sensor data.

The fourth embodiment may be combined with the first embodiment and the third embodiment.

The description of the embodiments above has been made in terms of a case in which the sensor 110 is a temperature sensor. However, the present invention is not limited to this, and the sensor may be, for example, a humidity sensor, an illuminance sensor, an ultraviolet sensor, a carbon dioxide sensor, an impact sensor, and other biological sensor or chemical sensor. Also, although the description has been made in terms of a case in which the wireless tag 100 has a single sensor built in, the wireless tag 100 may have a plurality of sensors built in and may have a plurality of types of sensors together. The description above has been made in terms of a case in which the criteria data transmitted by the wireless tag reader/writer 200 is set such that the sensor data is determined to be normal when the temperature is zero degrees or higher and lower than 30 degrees. However, the criteria data may be set such that the sensor data is determined to be normal (or abnormal) when the measurement value is out of a specified range, or when the rate of change of the measurement value is less than or higher than a specified value. The determination unit 104 may perform determination on the basis of combination of several types of criteria data.

Although the above description has been made in terms of a case in which the wireless tag 100 transmits a determination result in response to a determination result request transmitted by the wireless tag reader/writer 300, the wireless tag 100 may transmit a determination result automatically at constant intervals.

Further, the description of the embodiments above has been made in terms of an example in which the determination unit 104 determines whether the sensor data indicating information on the area surrounding the wireless tag or the commodity to which the wireless tag is attached is normal or not based on the criteria data. However, the determination unit 104 may make determination on the sensor data and a time at which the sensor data is detected. For example, the determination may be made on a difference T1-T0 between a detection time T1 at which sensor data D1 is detected and a detection time T0 at which sensor data D0 is detected one cycle before the sensor data D1, while the criteria data may be set such that the sensor data is determined to be abnormal when the difference between the detection times is greater than the detecting cycle T of the sensor data. In this case, the determination can be made whether the sensor operates normally or not.

The present invention is applicable for acquiring information detected by sensors and, particularly, is effectively applicable for shortening the communication time for acquisition of the information.

What is claimed is:

1. A wireless tag wirelessly communicating with a wireless tag reader/writer, comprising:
   a sensor for detecting physical stimulus in and/or around the wireless tag to generate a detected information set;
   a first storage for storing the detected information set;
   a determination unit for storing a criteria information set and outputting a determination result information set as a result of determination on the detected information set on the basis of the criteria information set; and
   a communication control unit for transmitting the determination result information set output by the determination unit to the wireless tag reader/writer and receiving another criteria information set transmitted from the wireless tag reader/writer,
   wherein in response to receiving a request for at least one of a detected information set and a determination result information set from wireless tag reader/writer, the communication control unit transmits the request information set(s) to the wireless tag reader/writer.

2. The wireless tag according to claim 1, wherein:
   the first storage stores a time information set indicating time at which a detected information is detected, in association with the detected information set; and
   the communication control unit transmits to the wireless tag reader/writer the time information set and at least one of the detected information set and the corresponding determination result information set.

3. The wireless tag according to claim 1, wherein the determination unit updates the criteria information set to the other criteria information set.

4. A wireless tag wirelessly communicating with a wireless tag reader/writer, comprising:
   a sensor for detecting physical stimulus in and/or around the wireless tag to generated a detected information set;
   a first storage for storing the detected information set;
   a determination unit for storing a criteria information set and outputting a determination result information set as a result of determination on the detected information set on the basis of the criteria information set;
   a communication control unit for transmitting the determination result information set output by the determination unit to the wireless tag reader/writer and receiving another criteria information set transmitted from the wireless tag reader/writer; and
   a second storage for storing the determination result information set,
   wherein, in response to receiving a request for the determination result information set from the wireless tag reader/writer, the communication control unit transmits the determination result information set stored in the second storage.

5. The wireless tag according to claim 4, wherein:
   the first storage stores a time information set indicating time at which a detected information is detected, in association with the detected information set; and
   the communication control unit transmits to the wireless tag reader/writer the time information set and at least one of the detected information set and the corresponding determination result information set.

6. The wireless tag according to claim 4, wherein the determination unit updates the criteria information set to the other criteria information set.

7. A wireless tag reader/writer wirelessly communicating with a wireless tag having a detection unit for detecting information on the wireless tag itself and the area surrounding the wireless tag,
   wherein the wireless tag reader/writer transmits an information set to request the wireless tag for a determination result information set indicating a result of determination on the detected information set on the basis of a criteria information set,
   wherein the wireless tag reader/writer transmits another criteria information set to the wireless tag, and
   wherein the wireless tag updates the criteria information set to the other criteria information set.

8. The wireless tag reader/writer according to claim 7, wherein the wireless tag reader/writer transmits an information set to request the wireless tag for the detected information.

9. A method of transmitting a information set from a wireless tag to a wireless tag reader/writer, comprising the steps of:
   detecting physical stimulus in and/or around the wireless tag to generate a detected information set by a sensor of the wireless tag;
   storing the detected information set to a first storage of the wireless tag;
   evaluating, at the wireless tag, the detected information set on the basis of a criteria information set, which is previously transmitted to the wireless tag and stored in a second storage, to generate a determination result information set;
   transmitting the determination result information set from the wireless tag to the wireless tag reader/writer; and
   receiving and storing in the second storage another criteria information set transmitted from the wireless tag reader/writer.

10. The method of claim 9, further comprising updating the criteria information set to the other criteria information set.

11. A wireless tag system comprising a wireless tag and a wireless tag reader/writer that wirelessly communicating with the wireless tag, wherein the wireless tag comprises:
a sensor for detecting physical stimulus in and/or around the wireless tag to generate a detected information set;
a first storage for storing the detected information set;
a determination unit for storing a criteria information set and outputting a determination result information set as a result of determination on the detected information set on the basis of the criteria information set; and
a communication control unit for transmitting the determination result information set output by the determination unit in response to receiving a request for the determination result information set, wherein the wireless tag reader/writer transmits the request to the wireless tag and receives the determination result information from the wireless tag, and wherein the communication control unit receives another criteria information set transmitted from the wireless tag reader/writer.

12. The system of claim 11, wherein the determination unit updates the criteria information set to the other criteria information set.

* * * * *